US007613714B2

(12) United States Patent
Hiller et al.

(10) Patent No.: US 7,613,714 B2
(45) Date of Patent: Nov. 3, 2009

(54) SYSTEMS AND METHODS FOR ANALYZING A STREAM OF DATA RECORDS RELATING TO ELECTRONIC DATA PROCESSING PERFORMANCE

(75) Inventors: Ronald G. Hiller, Colts Neck, NJ (US); Armin Arshad Abdulghani, Piscataway, NJ (US); Vitaliy Fuks, Marlboro, NJ (US); Shreekala Kekuda, Cliffwood, NJ (US)

(73) Assignee: NetScout Systems, Inc., Westford, MA (US)

( * ) Notice: Subject to any disclaimer, the term of this patent is extended or adjusted under 35 U.S.C. 154(b) by 324 days.

(21) Appl. No.: 11/743,025

(22) Filed: May 1, 2007

(65) Prior Publication Data

US 2007/0260581 A1   Nov. 8, 2007

Related U.S. Application Data

(60) Provisional application No. 60/796,664, filed on May 2, 2006.

(51) Int. Cl.
*G06F 17/30* (2006.01)
(52) U.S. Cl. .................... 707/100; 707/102; 715/200
(58) Field of Classification Search .................. 707/3, 707/100, 102, 104.1, 200; 715/200
See application file for complete search history.

(56) References Cited

U.S. PATENT DOCUMENTS 5,933,835 A * 8/1999 Adams et al. ............ 707/104.1

| 6,466,944 | B1 * | 10/2002 | Stokes | 707/102 |
|---|---|---|---|---|
| 7,333,993 | B2 * | 2/2008 | Fair | 707/100 |
| 2001/0014894 | A1 * | 8/2001 | Han et al. | 707/202 |
| 2006/0074929 | A1 * | 4/2006 | Weber et al. | 707/100 |

OTHER PUBLICATIONS

Stelovsky et al., Software Architecture for Unified Management of Event Notification and Stream I/O and its use for Recording and Analysis of User Events, System Sciences, 2002. HICSS. Proceedings of the 35th Annual Hawaii International Conference on, Jan. 7-10, 2002, pp. 1862-1867.*
Beyer et al., "Bottom-up computation of sparse and Iceberg CUBEs", *Proceedings of the 1999 ACM SIGMOD conference on the management of data*, vol. 28, issue 2, Jun. 1999.

* cited by examiner

*Primary Examiner*—Greta L Robinson
(74) *Attorney, Agent, or Firm*—Finnegan, Henderson, Farabow, Garrett & Dunner LLP

(57) ABSTRACT

Disclosed methods and systems create channels from a stream of data records relating to electronic data processing system performance. Each data record includes the attribute value for each of a plurality of attributes related to the electronic data processing system. A channel is created for each unique value of a selected attribute or each unique combination of values for a plurality of selected values. Each channel is analyzed to determine if it meets at least one criterion. The unique value or combination of values of a channel meeting the at least one criterion is reported. The foregoing steps may be repeated using the results of previous steps. At least once, a channel is created for each unique combination of attribute values for a plurality of selected attributes.

23 Claims, 17 Drawing Sheets

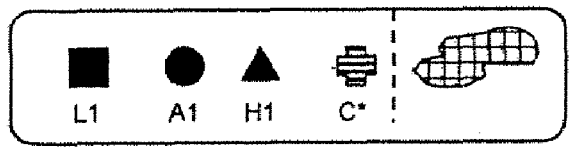 Record 420-7
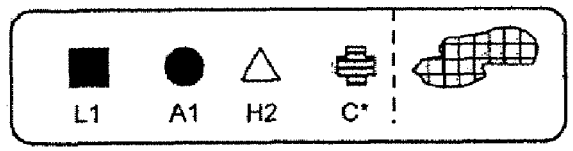 Record 420-8
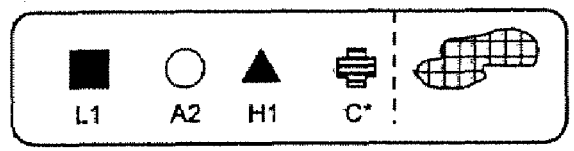 Record 420-9
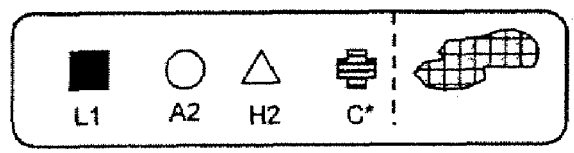 Record 420-10
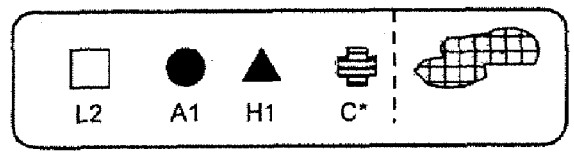 Record 420-11
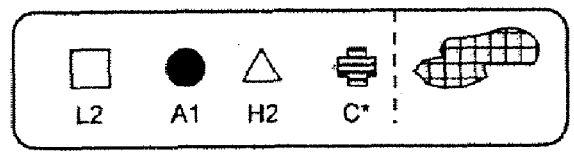 Record 420-12
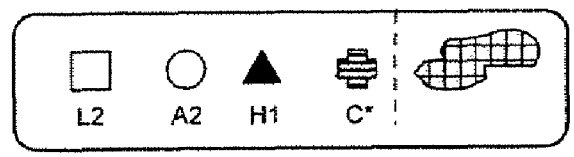 Record 420-13
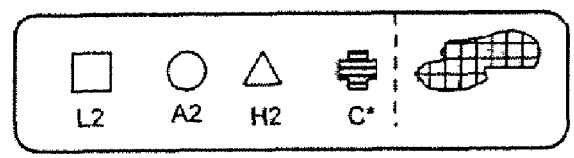 Record 420-14
FIG. 4C

| | | |
|---|---|---|
| Node Type Name | Brdcst DTE | |
| Node Class | StatsRunNode() — 680-8 | |
| Thing | bcast_rate | |
| Source | topmon.Link DTE | |
| Parameters 660 | | 1 / 2 |
| | 1 'stepLabel' | 'Broadcast' |
| | 2 'syncBack' | '0.75' |
| | 3 'groupBy' | 'mel_id' |
| | 4 'mushBack' | '1.0' |
| | 5 | |
| Restrictions | | 1 / 2 |
| | 1 'protocol' | 'FR' |
| | 2 'direction' | 'T' |
| | 3 | |
| | 4 | |
| | 5 | |
| Branch if none | Relvnt DTE | |
| Branch if one | Relvnt DTE | |
| Branch if some | Relvnt DTE | |
| Branch if all | Relvnt DTE | |
| Description | Is it a broadcast problem? | |

Ok     Cancel 610, 620, 630, 640

| | Node Properties | | |
|---|---|---|---|
| 610 | Node Type Name | Diagnosis D3 | |
| 620 | Node Class | NotificationNode() | |
| 630 | Thing | None | |
| 640 | Source | None | |
| | Parameters | 1 | 2 |
| | | 1 'diagnosisDepth' | '3' |
| | | 2 'severity' | 'major' |
| | | 3 'problemClass' | 'utilization' |
| | | 4 | |
| | Restrictions | 1 | 2 |
| | | 1 'protocol' | 'summary' |
| | | 2 | |
| | | 3 | |
| | | 4 | |
| | Branch if none | None | |
| | Branch if one | None | |
| | Branch if some | None | |
| | Branch if all | None | |
| | Description | A problem | |
| | Ok | | Cancel |

| | | |
|---|---|---|
| Node Type Name | L1 | |
| Node Class | NotificationNode() | |
| Thing | None | |
| Source | None | |
| Parameters | 1 | 1 'diagnosisDepth' '1000000' |
| | 2 | 2 'severity' 'major' |
| | 3 | 3 'problemClass' 'utilization' |
| | 4 | |
| | 5 | |
| Restrictions | 1 | 1 "protocol" 'summary' |
| | 2 | 2 |
| | 3 | |
| | 4 | |
| | 5 | |
| Branch if none | None | |
| Branch if one | None | |
| Branch if some | None | |
| Branch if all | None | |
| Description | A problem | |
| Ok | | Cancel |

610 — Node Type Name
620 — Node Class
630 — Thing
640 — Source

SYSTEMS AND METHODS FOR ANALYZING A STREAM OF DATA RECORDS RELATING TO ELECTRONIC DATA PROCESSING PERFORMANCE

RELATED APPLICATIONS

This application claims priority under 35 U.S.C. 119(e) to U.S. Provisional Application Ser. No. 60/796,664, entitled "SYSTEMS AND METHODS FOR ANALYZING A STREAM OF MEASUREMENT RECORDS RELATING TO ELECTRONIC DATA PROCESSING," and filed on May 2, 2006, which is herein incorporated by reference in its entirety.

BACKGROUND

In recent years, advances in computer and network technology have led to the growth of networks providing fast and inexpensive access to information resources throughout the world. Networked computers are used at work, at home, and at school to share information and other content. Businesses use computer networks to deliver software, content, and services as well as to advertise and offer goods and services for sale. Consumers and businesses may select and purchase a variety of goods and services on-line. For example, books, clothing, electronics, and automobiles can be purchased on-line through vendor web sites. Likewise, financial services (such as stock trading, banking, and portfolio management), travel services, and news and information services, among others, are available on-line. Equally important, but perhaps not as evident to consumers, are a variety of on-line network services that support on-line businesses, such as transaction processors, security services, and e-mail service providers. Regardless of the type of goods and services provided, all on-line business must be concerned with the performance of their network operations. E-businesses unable to provide consistent, high performance are not likely to survive.

Individual businesses or entities that provide network applications have different network performance concerns. For example, a company may hire a Web service provider to provide its on-line services. The company may wish to conduct periodic audits to ensure that the Web service provider is fulfilling its obligation to provide satisfactory service. Similarly, the Web service provider may wish to validate the level of service quality it is providing and identify any problems that may exist or that may arise.

Network management tools can be used to collect data from various locations and at various times. For example, the tools may collect connect times, download times for individual pages, domain name server (DNS) look-up times, error messages, link octet rate, application octet rate, and link utilization for a server among other things. In fact, network management tools may monitor tens or hundreds of parameters for a given website. Data from the monitoring may be organized into data records. The streams of data records generated by the network management tools may be analyzed to evaluate network performance and detect and diagnose problems. While the description above is primarily directed to network applications, it should be appreciated that data streams can be generated by a variety of detectors, sensors, or other sources and that analysis of those data streams may also be desired.

In conventional automated analysis systems, the measurements are analyzed either as an aggregate (i.e. all intermingled) or as distinct channels based on their origin. For example, the link utilizations from a set of network measurements may be analyzed as a group, in order to determine which, if any, of them are anomalous. The output of this stage, the anomalous links, is useful on its own. However, the sophistication of subsequent analyses is limited since the output of this stage has one key—link identifier in the example.

SUMMARY OF EXEMPLARY EMBODIMENTS

Methods and systems are disclosed that create a channel from a stream of data records relating to electronic data processing performance. Each data record includes an attribute value for each of a plurality of attributes of the performance of an electronic data processing system. In one embodiment, the data records comprise measurement records relating to electronic data processing system performance. In another embodiment, each data record also includes at least one measurement related to electronic data processing system performance.

One embodiment consistent with principles of the invention is a method for analyzing a stream of data records relating to electronic data processing system performance. The method, which includes creating a channel of data records for each attribute value of a set of attributes having as a member at least one attribute. A first set of channels is thereby created. The method also includes analyzing each channel in the first set of channels to identify each channel meeting a first criterion, thereby creating a set of first criterion meeting channels, and reporting the attribute value of each member of the set of attributes for each channel in the set of first criterion meeting channels. The method includes creating a set of first criterion meeting attribute value combination channels by using the set of first criterion meeting channels, to identify each channel of data records therein having a unique combination of attribute values of a first attribute and a second attribute and meeting the first criterion. The method also includes reporting the unique combination of attribute values of the first attribute and the second attribute for each channel in the set of first criterion meeting attribute value combination channels.

In another aspect of the embodiment, creating the set of first criterion meeting attribute value combination channels further comprises creating a second set of channels for data records for each attribute value of the second attribute. The second set is used to identify each channel, in the set of first criterion meeting channels, having the unique combination of attribute values and meeting the first criterion.

In one aspect of the invention, the first set of channels and the second set of channels are created simultaneously, and may be used as inputs to develop a set of channels of specified characteristics for use in analysis of measurement records at subsequent nodes of a decision tree. The set of first criterion meeting channels and the second set of channels may be joined together to identify the set of first criterion meeting attribute value combination channels therefrom. For example, the set of first criterion meeting attribute value combination channels may be formed that comprises the intersection of channels in the set of first criterion meeting channels and the second set of channels. In a still further embodiment, a set of channels may be formed in any suitable manner, for example the set could comprise the union of the set of first criterion meeting channels and the second set of channels.

In another aspect, the set of first criterion meeting attribute value combination channels is created by developing the second set of channels from the set of first criterion meeting channels such that the second set comprises channels with data records having the unique combination of attribute values of the first attribute and the second attribute and meeting the first criterion.

In another aspect of the embodiment, a second set of channels is created comprising a channel of data records for each attribute value of the second attribute. Each channel in the second set is analyzed to identify each channel meeting a second criterion to create a set of second criterion meeting channels. The set of second criterion meeting channels and the set of first criterion meeting channels are analyzed to identify each channel having the unique combination of attribute values and meeting the first criterion and the second criterion, thereby creating a set of first and second criteria meeting attribute value combination channels. Reporting the unique combination of attribute values further comprises reporting the unique combination of attribute values of the first attribute and the second attribute associated with each channel in the set of first and second criteria meeting attribute value combination channels.

Another embodiment consistent with principles of the invention is a method for analyzing a stream of data records, which includes creating a channel of data records for each unique combination of attribute values of a first attribute and a second attribute. A first set of channels is thereby created such that a channel in the first set includes data records having a unique combination of attribute values of the first attribute and the second attribute. The method also includes analyzing each channel in the first set to identify each channel meeting a first criterion and reporting the unique combination of values of the first attribute and the second attribute for each channel in the first set meeting the first criterion, thereby creating a set of first criterion meeting channels. The method includes creating, from a channel in the set of first criterion meeting channels, a channel of data records for each attribute value of at least one attribute. A second set of channels is thereby created. The method also includes analyzing each channel in the second set to identify each channel meeting a second criterion, thereby creating a set of first and second criteria meeting channels, and reporting the attribute value of each of the at least one attribute for each channel in the set of first and second criteria meeting channels.

In one embodiment, each data record includes an attribute value for each of a plurality of attributes of a computer and at least one measured value related to computer performance. In another embodiment, each data record includes an attribute value for each of a plurality of attributes of a network and at least one measured value related to network performance. In another embodiment, the plurality of attributes includes a link identifier and an application identifier.

In another embodiment, the invention comprises a system for analyzing a stream of data records relating to electronic data processing performance, with the system having a memory and a processor that are arranged to perform the methods described above. Further, in another embodiment, the invention comprises a computer program having instructions to configure a computer to execute the methods described above.

Additional embodiments consistent with principles of the invention are set forth in the detailed description which follows or may be learned by practice of methods or use of systems or articles of manufacture disclosed herein.

BRIEF DESCRIPTION OF THE DRAWINGS

The accompanying drawings, which are incorporated in and constitute a part of this specification, illustrate several embodiments consistent with aspects of the invention and together with the description, serve to explain the principles of the invention. In the drawings:

FIGS. 4A, 4B, and 4C each illustrate exemplary records of three sets of channels of measurement records for analysis, consistent with features and principles of the present invention;

FIGS. 6-12 illustrate exemplary nodes in the decision tree of FIG. 5; consistent with features and principles of the present invention.

DETAILED DESCRIPTION

Reference is now made in detail to exemplary embodiments of the invention, examples of which are illustrated in the accompanying drawings.

Methods and systems for analyzing a stream of data records relating to electronic data processing system performance, consistent with principles of the present invention, are disclosed herein. The invention is based at least in part on the recognition that analysis of a stream of data records can be improved by the capacity to separate the stream into channels having specific characteristics. Embodiments of the invention can include creating a channel of data records for each unique combination of values of a plurality of attributes, thereby creating a set of channels wherein a channel in the set includes data records having a unique combination of values of a plurality of attributes.

Figure 1:
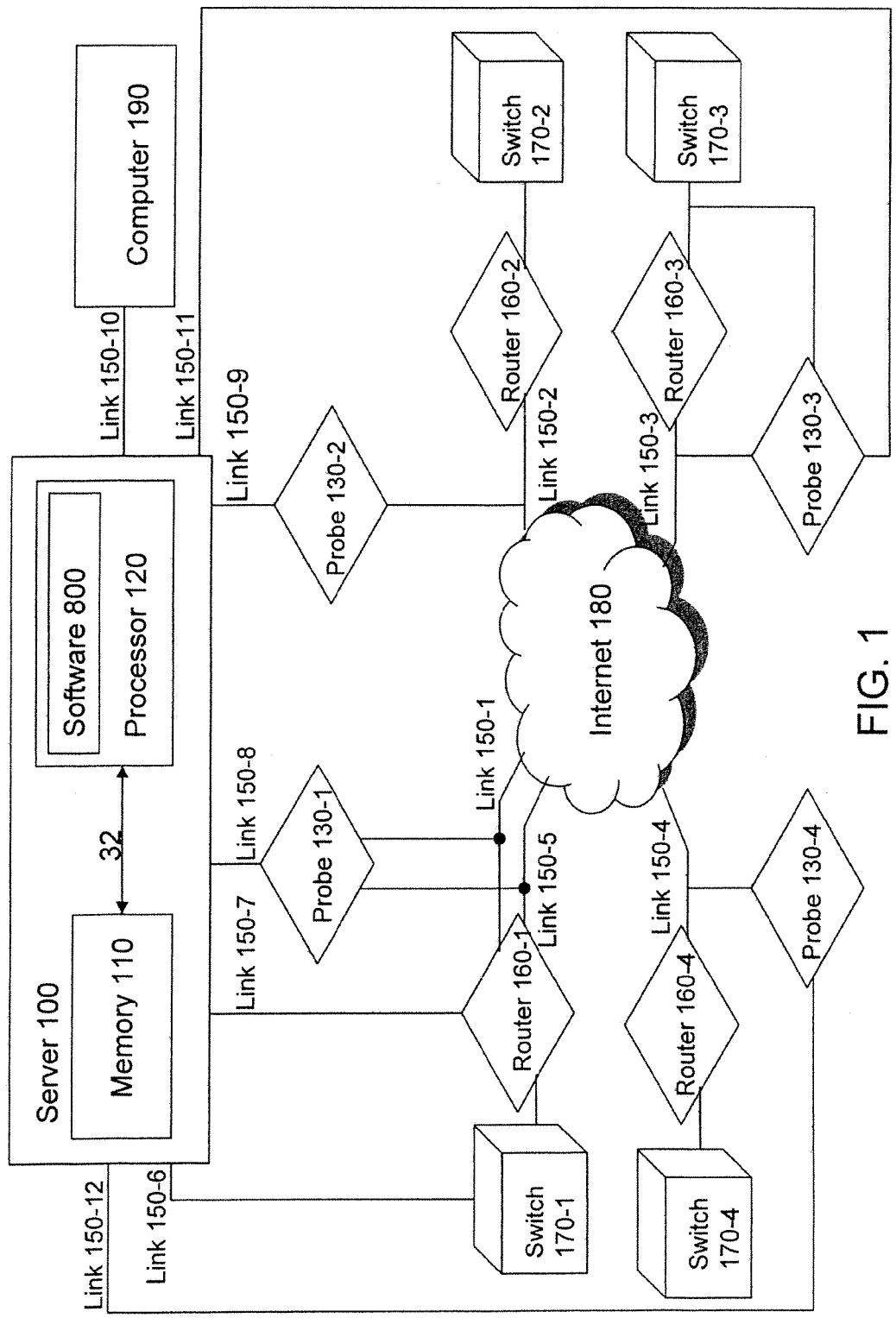
FIG. 1 illustrates an exemplary electronic data processing system, consistent with features and principles of the present invention.

FIG. 1 illustrates an exemplary electronic data processing system, consistent with features and principles of the present invention. In particular, FIG. 1 illustrates a network whose performance is monitored. The network includes a plurality of routers 160-1, . . . , 160-n and a plurality of switches 170-1, . . . , 170-n. A plurality of links 150-1, . . . , 150-n connect the components of the network. Link 150 can be any type of communication mechanism, such as a T1, T3, or E3 line, and can connect to a network such as internet 180. A plurality of probes 130-1, . . . , 130-n provide a stream of measurement records to a server 100. Additionally or alternatively, a stream of measurement records can be provided to server 100 directly from one or more linked routers 160, switches 170, and/or computers 190.

An exemplary server 100 has a processor 120 and memory 110 to implement the method embodiments of the present invention described herein. The processor 120 is arranged to receive information from the switches 170-1, . . . , 170-n and the probes 130-1, . . . , 130-n and to create the stream of measurement records therefrom. The processor then performs the computations and analyses on the measurement records. The computations and analyses may be performed on the measurement records in real time, or they may be performed on records that have been stored in the memory 110. The server 100 may be any one of a variety of commercially available servers, such as Dell Model 2850, which is available from Dell Inc. of Round Rock, Tex., or NetScout nGenius™ Performance Manager Appliance system which is available from NetScout Systems, Inc. of Westford, Mass.

The particular server and processor as described in this embodiment should not be construed as limitations. Other types of commercially available servers, as well as processors and hardware controlling access to these particular devices, may be also be included in an embodiment.

In one embodiment, the processor 120 may be connected to the memory 110 through the connection 32. The processor 120 may use a computer program product in the form of software 800 to analyze the stream of measurement records stored in the memory 110.

The measurement records analysis software 800 may reside on memory 110, or any suitable computer readable medium, including but not limited to non-volatile Read Only Memory (ROM) or (2) being alterably stored on writable storage media such as compact disks (CDs), random access memory (RAM) devices, floppy disks, and other magnetic and optical media, or (3) being conveyed to a computer such as processor 120 through communication media, for example using baseband signaling or broadband signaling techniques, as in an electronic network such as the Internet or telephone modem lines. The operations and methods may be implemented in a software executable out of a memory by a computer such as processor 120 or as a set of instructions embedded in a carrier wave. Alternatively the operations and methods may be embodied in whole or in part using hardware components such as Application Specific Integrated Circuits (ASICs), state machines, controllers or other hardware components or devices, or a combination of hardware and software components.

In addition, although the details of the software 800 may reside in a particular processor 120, similar software components may exist in other processors such as computer 190 or on computer readable medium accessible by computer 190 or processor 120.

Figure 2:
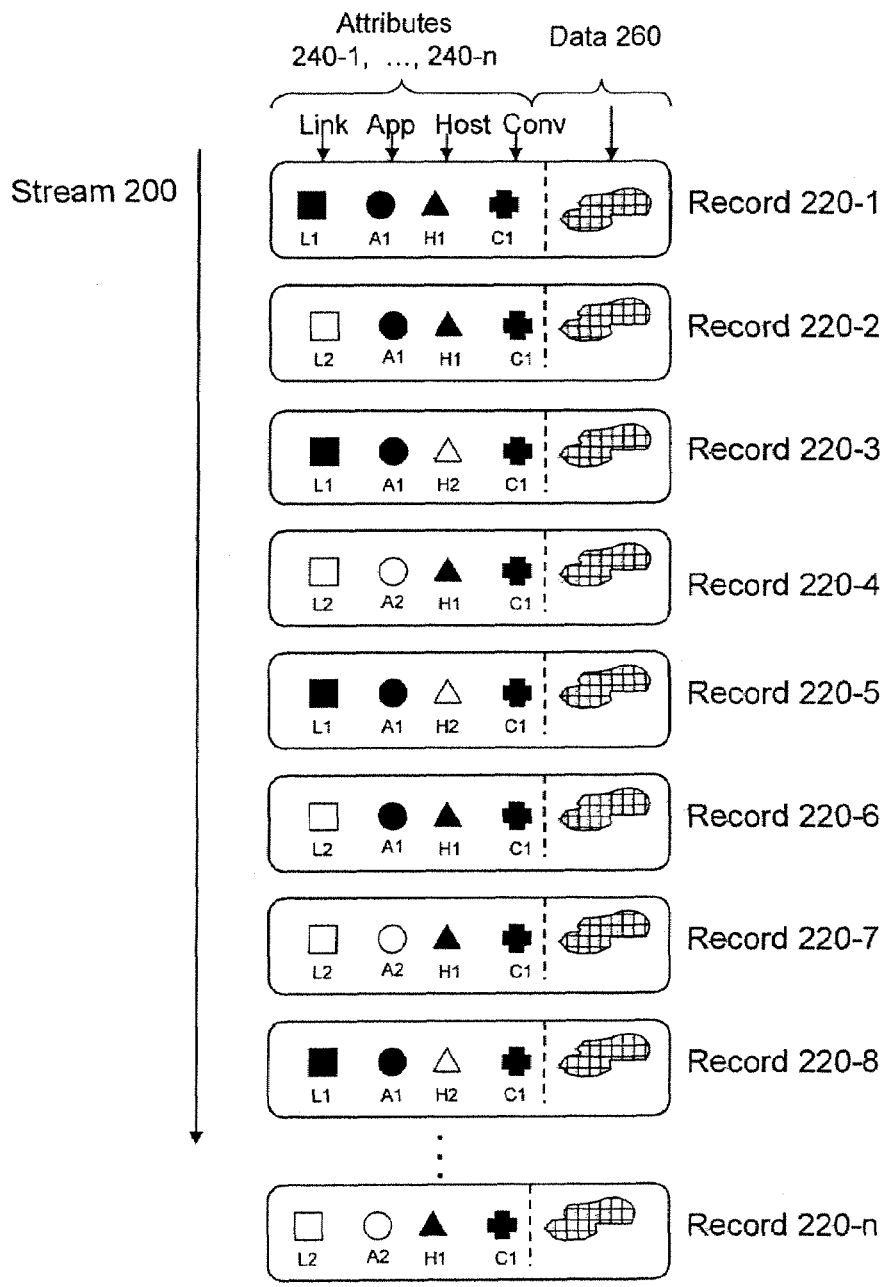
FIG. 2 illustrates an exemplary stream of measurement records, consistent with features and principles of the present invention.

FIG. 2 illustrates an exemplary stream 200 of measurement records 220-1, . . . , 220-n, consistent with features and principles of the present invention. Each measurement record includes a value for a plurality of attributes 240-1, . . . , 240-n and data 260 including at least one measurement. The data can include a day and/or time stamp. An attribute is a feature, characteristic, or property of an instance or a component that has a value. In the exemplary stream 200, an attribute is a feature of a component of the electronic data processing system. Each record 240 includes a value for each of four attributes: a link identifier 240-1, an application identifier 240-2, a host identifier 240-3, and a protocol identifier 240-4. Exemplary link identifiers include "nFR_9:if4", "nFR_9:if4:site 193", and "nFR_9:if4:Multicast:QOS level 0." Exemplary application identifiers include "TELNET", "SNMP", "NTP", and "FTP-CTRL."Exemplary host identifiers include "www.netscout.com" and "192.168.10.11."Exemplary protocol identifiers include "unicast", "broadcast", "UDP", "TCP", and "ICMP." Nonetheless, consistent with the invention, a record 220 in stream 200 need not include a value for each attribute 240. Additionally, consistent with the invention, records 220 in stream 200 can have different numbers of attributes. For example, a record 220 in stream 200 could have two attributes or seven attributes instead of the four shown in FIG. 2. Moreover, the number of identifier values in stream 200 can change—for example, as links or hosts are added or removed; as applications are launched or closed; or as conversations are begun or ended.

Data 260 can include any appropriate measurement of the electronic data processing system. Exemplary measurements of a network include network utilization percentage, client response time, error rate, octet rate, multicast rate, broadcast rate, average packet size, and new connection rate. Consistent with the invention, a record 220 in stream 200 need not include a value for each measurement.

Consistent with FIG. 1, probe 130 can periodically create a record 220 for each unique combination of packet attributes. Thus, if probe 130 finds packets having three different application identifiers in one period, it creates at least one record 220 for each application identifier. Alternatively, records can be created using synthetic transactions. A synthetic transaction can be, for example, a web page request initiated specifically to identify the associated response times.

Figure 3A:
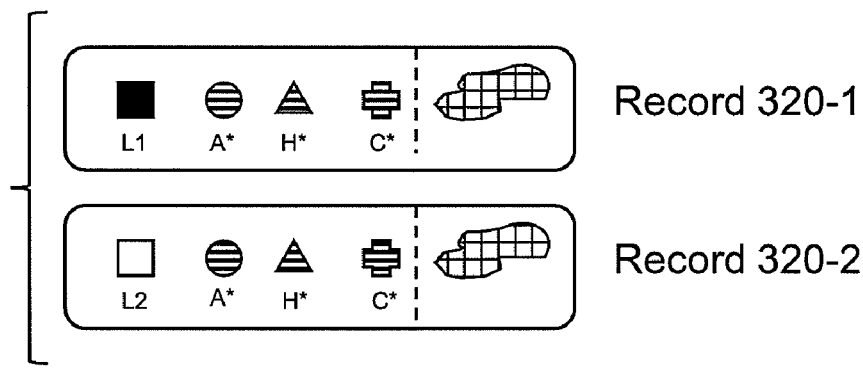
FIGS. 3A and 3B each illustrate an exemplary record of a set of channels of measurement records for analysis, consistent with features and principles of the present invention.

When one or more channels are created from stream 200 consistent with the invention, each record in a channel will share at least one characteristic. For example, a channel can be created for each link identifier value in records 220-1, . . . , 220-n. In this example, if the records shown in FIG. 2 illustrate all of the link attribute values in the stream 200, two channels will be created from stream 200 because the records 220-1, . . . , 220-n in stream 200 include two values of link identifiers, L1 and L2. If there were more link identifier values in records 220-1, . . . , 220-n, more channels would be created. A stream can have, for example, hundreds of link identifier values. FIG. 3A illustrates an exemplary record 320-1 from the channel including the records having a first link identifier, L1. In record 320-1, the asterisk in the labels "A*," "H*," and "C*" means that, in that channel, the application identifier, host identifier, and conversation identifier, respectively, can have any value or no value (i.e., the records may not feature the attribute at all). Of the records shown in stream 200 of FIG. 2, four (namely records 220-1, 220-3, 220-5, 220-8) include the first link identifier L1 so those four would be in the same channel as record 320-1. FIG. 3A also illustrates an exemplary record 320-2 from the channel including the records having a second link identifier, L2. Of the records shown in stream 200 of FIG. 2, five (namely records 220-2, 220-4, 220-6, 220-7, 220-n) include the second link identifier L2 so those five would be in the same channel as record 320-2.

Figure 3B:
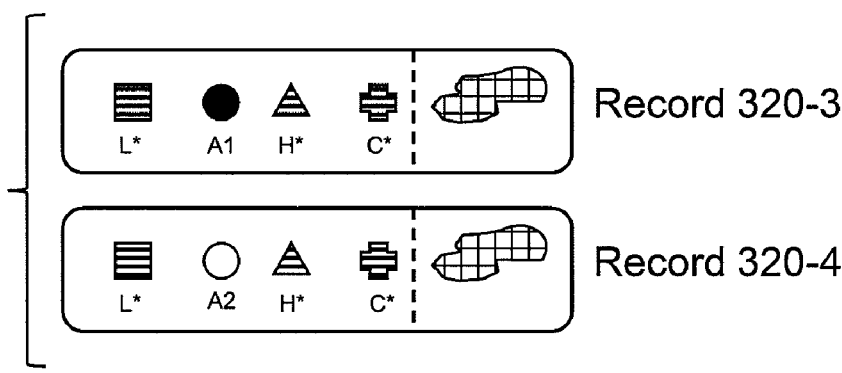

For another example, a channel can be created for each application identifier value in records 220-1, . . . , 220-n. In this example, if the records shown in FIG. 2 illustrate all of the application attribute values in the stream 200, two channels will be created from stream 200, namely, one channel in which all application identifiers are A1 and another channel in which all application identifiers are A2, because the records 220-1, . . . , 220-n in stream 200 include two values of application identifiers, A1 and A2. Similarly, if there were more application identifier values in records 220-1, . . . , 220-n, more channels would be created. FIG. 3B illustrates an exemplary record 320-3 from the channel including the records having a first application identifier, A1. In record 320-3, the asterisk in the labels "L*," "H*," and "C*" mean that a record having any value or no value for a link identifier, a host identifier, and a conversation identifier are included in the channel. If the records shown in FIG. 2 illustrate all of the records in the stream 200, six (namely records 220-1, 220-2, 220-3, 220-5, 220-6, 220-8) include the first application identifier A1 so those six would be in the same channel as record 320-3. FIG. 3B also illustrates an exemplary record 320-4 from the channel including the records having a second application identifier, A2. If the records shown in FIG. 2 illustrates all of the records in the stream 200, three (namely records 220-4, 220-7, 220-n) include the second application identifier A2 so those three would be in the same channel as record 320-4. Different channels can be independently created from a single stream as described in the two foregoing examples.

Figure 4A:
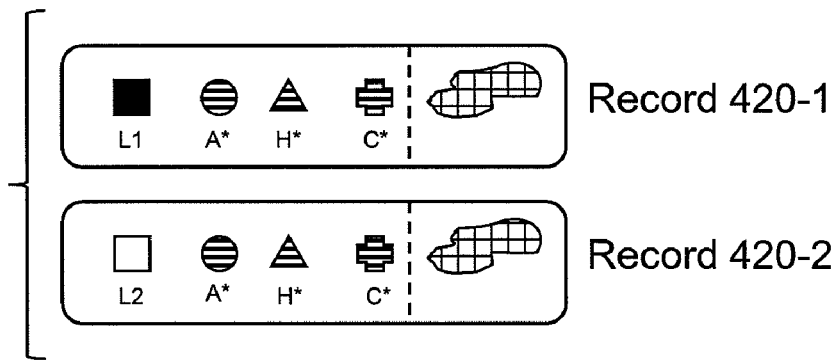
Figure 4B:
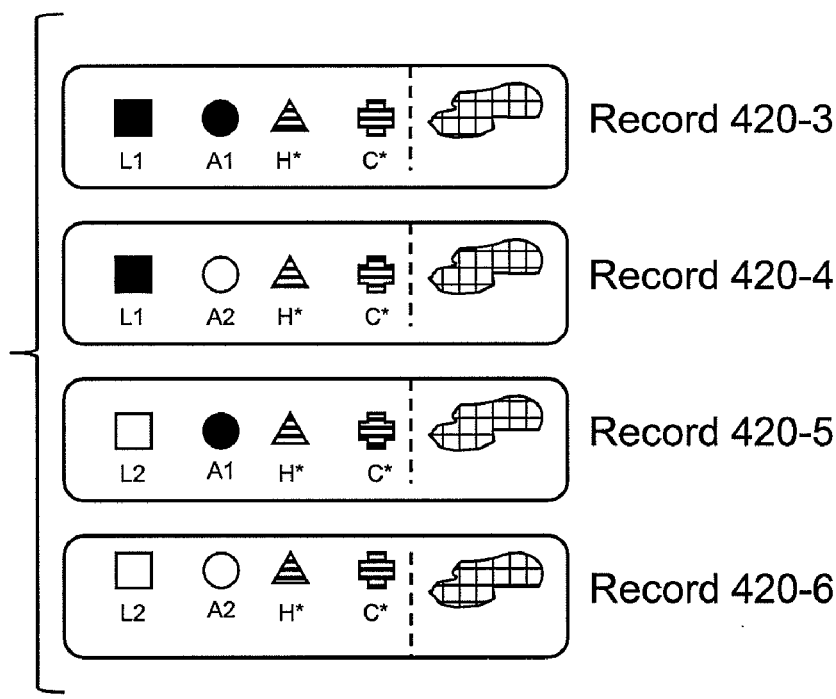

FIGS. 4A, 4B, and 4C illustrate exemplary records of three dependent sets of channels of measurement records for analysis, consistent with features and principles of the present invention. In the manner described above with reference to FIG. 3A, a channel can be created for each link identifier value in stream 200. In this example, if FIG. 2 illustrates all attribute values in the records in the stream 200, two channels will be created from stream 200. FIG. 4A illustrates an exemplary record 420-1 from the channel including the records having a first link identifier, L1. FIG. 4A also illustrates an exemplary record 420-2 from the channel including the records having a second link identifier, L2.

Each of the two channels exemplified in FIG. 4A can be analyzed to determine if it meets a first criterion. For example, each channel can be analyzed to determine if octet rates in the associated records exceed an identified threshold. If the channel exemplified by record 420-1 met the first criterion but the channel exemplified by record 420-2 did not, L1—the value of the link identifier of the channel exemplified by record 420-1—would be reported. If both channels exemplified in FIG. 4A met the first criterion, L1 and L2—the values for the link identifier of each channel—would be reported.

In FIG. 4B, the report of the foregoing analysis is used. A channel is created for each unique combination of link identifier values and application identifier values in the records having the link attribute that is reported as meeting the first criterion. Thus, only those link identifier values meeting the first criterion will be represented in the new channels. For the purposes of FIG. 4B, we presume that both channels exemplified in FIG. 4A met the first criterion.

In this example, the four channels exemplified by the records in FIG. 4B could be created because there are four possible unique combinations of values of link identifiers and values of application identifiers. However, if the records shown in FIG. 2 illustrates all attribute values in the records in stream 200, only channels exemplified by records 420-3, 420-5, and 420-6 of FIG. 4B would be created because there are no records shown in FIG. 2 having the combination represented by record 420-4, namely, (L1, A2). FIG. 4B illustrates an exemplary record 420-3 from the channel including the records having the unique combination of selected attribute values (L1, A1). FIG. 4B also illustrates exemplary records 420-5 and 420-6 from two channels respectively including the records having the unique combination (L2, A1) and the unique combination (L2, A2).

In the example described above, the first criterion meeting attribute value combination channels set was created by developing a set of channels for each value of an attribute, then developing a set of first criterion meeting channels for values of the attribute, and then developing the first criterion meeting attribute value combination channels. Alternatively, the steps used to create the set could be performed in a different order, for example by first developing attribute value combination channels for each unique combination of link identifier values and application identifier values, without reference to the first criterion, and then testing each of the channels so developed against the first criterion to form the first criterion meeting attribute value combination channels.

Returning to the general case, in which all four possible unique combinations of values of link identifiers and values of application identifiers are shown in the records from which the channels exemplified in FIG. 4B, each of the channels exemplified in FIG. 4B, which are created, can be analyzed to determine if it meets a second criterion. If all four channels are created and the channel exemplified by records 420-3, 420-4, and 420-5 each met the first criterion but the channel exemplified by record 420-6 did not, three combinations of values would be reported—(L1, A1); (L1, A2); and (L2, A1). If all channels exemplified in FIG. 4B met the second criterion, all four combinations of values would be reported.

In FIG. 4C, the report of the foregoing analysis is used. A channel is created for each unique combination of link and application identifier values of channels meeting the second criterion and host identifier values. As above, the order in which channels are created from values of the selected attributes and tests of selected criteria is at the choice of the analysis designer. Any order of channel creation is acceptable, so long as ultimately the selected attributes are considered and the selected criteria are tested for the selected stream of measurement records. Thus, at least once, a channel is created for each unique combination of attribute values for a plurality of selected attributes. The foregoing steps may be repeated using the results of previous steps.

In this example, the eight channels exemplified by the records in FIG. 4C could be created because there are eight possible unique combinations of values of link identifiers, values of application identifiers, and values of host identifiers. However, if the records shown in FIG. 2 illustrates all attribute values in the records of the stream 200, only channels exemplified by records 420-7, 420-8, 420-11, and 420-13 of FIG. 4C would be created because there are no records in stream 200 having the other possible combinations, namely, there are no records illustrated in FIG. 2 having the combinations (L1, A2, H1), (L1, A2, H2), (L2, A1, H2), (L2, A2, H2). FIG. 4C illustrates an exemplary record 420-7 from the channel including the records having the unique combination of selected attribute values (L1, A1, H1). FIG. 4C also illustrates exemplary records 420-8, 420-11, and 420-13 from three channels respectively including the records having the unique combinations (L1, A1, H2); (L2, A1, H1); and (L2, A2, H1).

Figure 5:
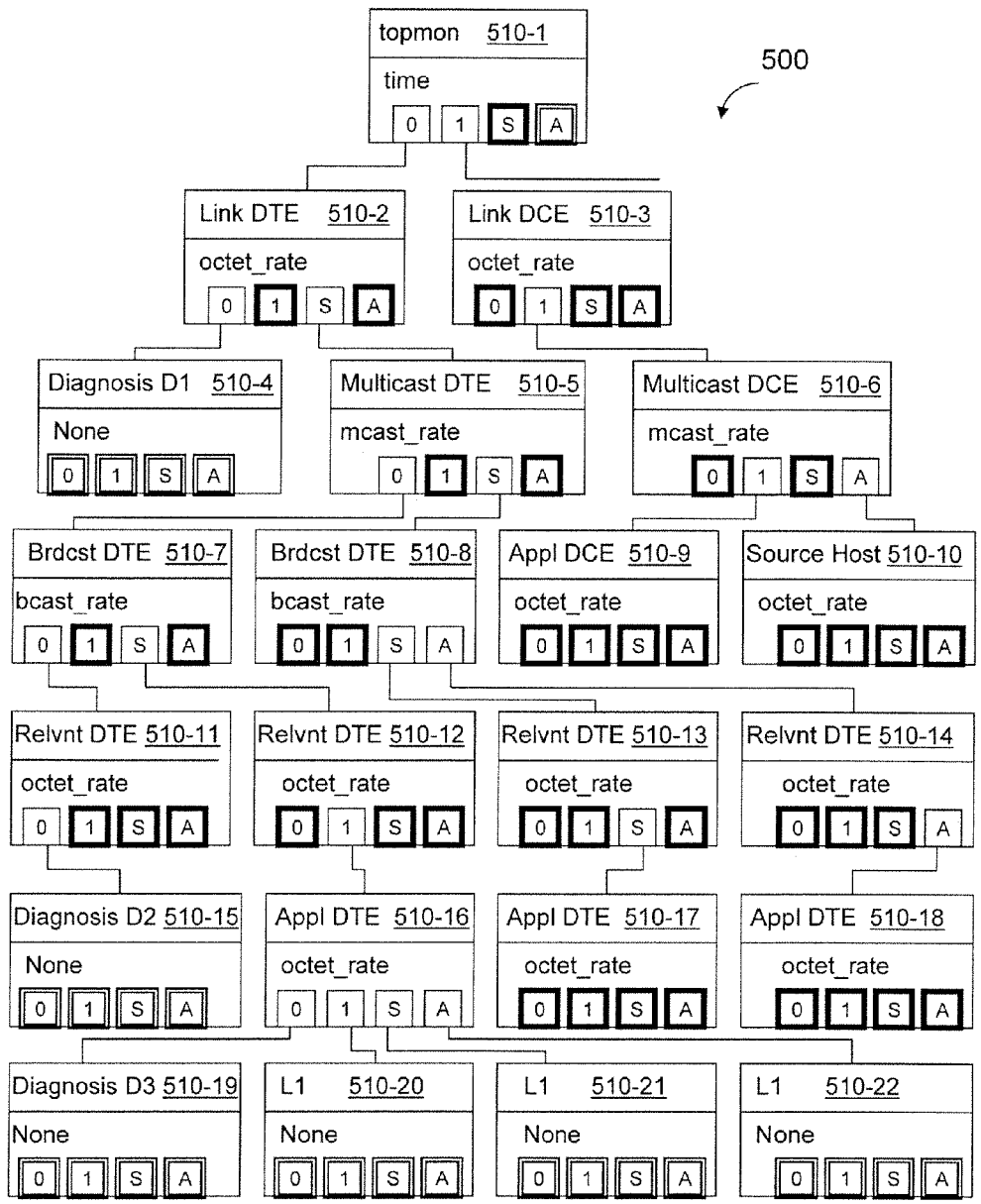
FIG. 5 illustrates a portion of an exemplary decision tree involving analysis of channels and reporting of results, consistent with features and principles of the present invention.

FIG. 5 illustrates a portion of an exemplary decision tree 500 involving creation of channels for each unique combination of values of selected attributes, consistent with features and principles of the present invention. The decision tree 500 includes a plurality of nodes 510-1, 510-1, ..., 510-n. Some nodes in the decision tree are analysis nodes, involving analyzing at least one channel to identify each channel that meets a criterion. For example, node 510-2, labeled "Link DTE", is an analysis node. Other nodes in decision tree 510 involve notification of a result. As decision tree 500 illustrates, notification nodes are typically the last node in a path. For example, node 510-4, labeled "Diagnosis D1", is a notification node. Alternatively, the decision tree 500 may have other type nodes than described above. For example, the decision tree 500 may have other types of analysis nodes, such as Source Host 510-10, in which another attribute of a channel is analyzed.

Each of the illustrated nodes 510 include four boxes—labeled "0," "1," "S," and "A"—indicating possible outcomes of analysis. The box labels "0,""1," "S," and "A" respectively correspond to zero, one, some, and all channels meeting the criterion of the node 510. Where none of the analyzed channels meet the criterion of the node, the analysis follows the path from the box labeled "0" in that node. For example, if none of the analyzed channels meet the criterion of node 510-2, labeled "Link DTE", decision tree 500 invokes node 510-4, labeled "Diagnosis D1". Where some number of the analyzed channels greater than 1 meet the criterion of the node, the analysis follows the path from box labeled "S" in that node. For example, if some of the analyzed channels meet the criterion of node 510-2, labeled "Link DTE", decision tree 500 invokes node 510-5, labeled "Multicast DTE".

Not all nodes 510 have all possible outcomes. Outcome boxes that are not available at a node are distinguished from similar boxes in other nodes. For example, none of the outcome boxes in node 510-4, which is labeled "Diagnosis D1" and, as noted above, which constitutes a notification node, are available. The unavailable outcomes of node 510-4 and of the other nodes in the decision tree 500 are shown in double-lined boxes in the nodes. In contrast, all of the outcome boxes in node 510-2, labeled "Link DTE", are available but the paths associated with boxes "1" and "A" are not shown in the illustrated portion of decision tree 500. The available outcomes of node 510-2 and of the other nodes in the decision tree 500 that have paths that are not shown in the decision tree 500 are shown as bold boxes in the node. Alternatively, nodes 510 may have other outcomes than described above. For example, in the example above, in addition to outcomes identified as "0," and "1," "S" and "A", an outcome could be defined to be obtained when the count of the number of channels meeting the criterion of the node 510 is another number other than 0 or 1, such as 2. In that case, "S" could be defined to be some number of channels greater than 2 that meet the criterion of the node. Alternatively, the outcome could be defined to be obtained when a count of the number of channels meeting the criterion falls within a range of values (such as 2-5 channels meeting the criterion). Additionally, the outcome set could be defined to be one outcome when the number of channels is fewer than a specified number and another outcome when the number is greater than or equal to the specified number. Alternatively, the outcome could be defined to be not count based. It could be determined by an attribute value or any defined characteristic, such as a maximum priority level of channels in the set of channels that meet the selected criterion.

Figure 6:
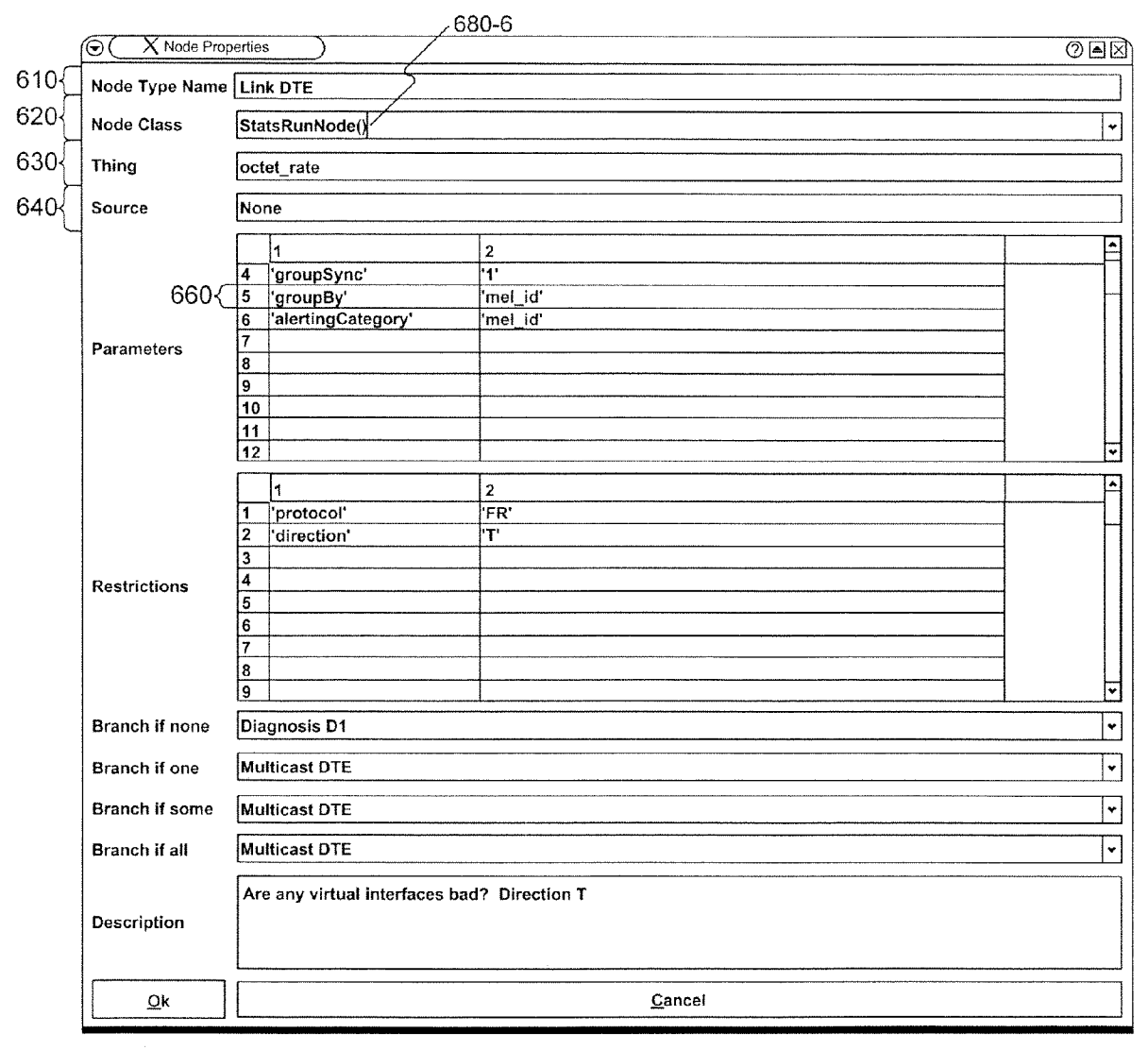

FIGS. 6-12 illustrate characteristics of exemplary nodes in the decision tree of FIG. 5, consistent with features and principles of the present invention. FIG. 6 corresponds with node 510-2, an analysis node. Like other exemplary analysis nodes, FIG. 6 includes a type 610, a class 620, a thing 630, a source 640, an attribute selector 660, and, if required by the analysis to be performed at the node, a criterion 680-6. The type 610 indicates the analysis done by the node. The class 620 indicates the analysis tool applied by the node. The thing 630 indicates the measurement that is the subject of the analysis. The source 640 indicates the source of records 220 used in the analysis. The attribute selector 660, labeled "groupBy," indicates the selected attribute or attributes. Each exemplary analysis node includes a criterion used for analysis if required by the analysis to be performed at the node. As may be seen in the analyses discussed below, the criterion may be of any suitable type and may be displayed in representations of the node using more than one field. As shown below, the examples of suitable criteria include dynamic statistical analysis of selected channels for anomaly detection and comparison of a data value from the channel with a threshold. Additional examples include evaluation of the number of records in a channel, evaluation of the time of arrival of selected records, evaluation of selected characteristics of selected channels.

In FIG. 6, the "Link DTE" label of node 510-2 is found in type 610. The "StatsRunNode" name in class 620 in FIG. 6 indicates that a method for dynamic statistical analysis of selected channels for anomaly detection such as disclosed in U.S. Pat. No. 7,031,884, which is hereby incorporated by reference, is used. The "StatsRunNode" name in class 620 also determines the criterion 680-6 for analysis—namely, anomalous measurements. The "octet_rate" name in thing 630 in FIG. 6 indicates that octet rate measurements in the records 220 are analyzed. The "None" name in source 640 in FIG. 6 indicates that stream 200 is used as the source of records 220 for the analysis. The "mel_id" groupBy in FIG. 6 is the attribute selector 660, indicating that link identifier is the selected attribute. Based on the characteristics illustrated in FIG. 6, node 510-2 would create a channel for each link identifier value in the stream 200 and analyze each channel to determine if it includes anomalous octet rate measurements. When no channel satisfies the criterion of the node 510-2 analysis, node 510-4 is invoked. When some channels meet the criterion in class 620 of node 510-2 in decision tree 500, node 510-5 is invoked.

Figure 7:
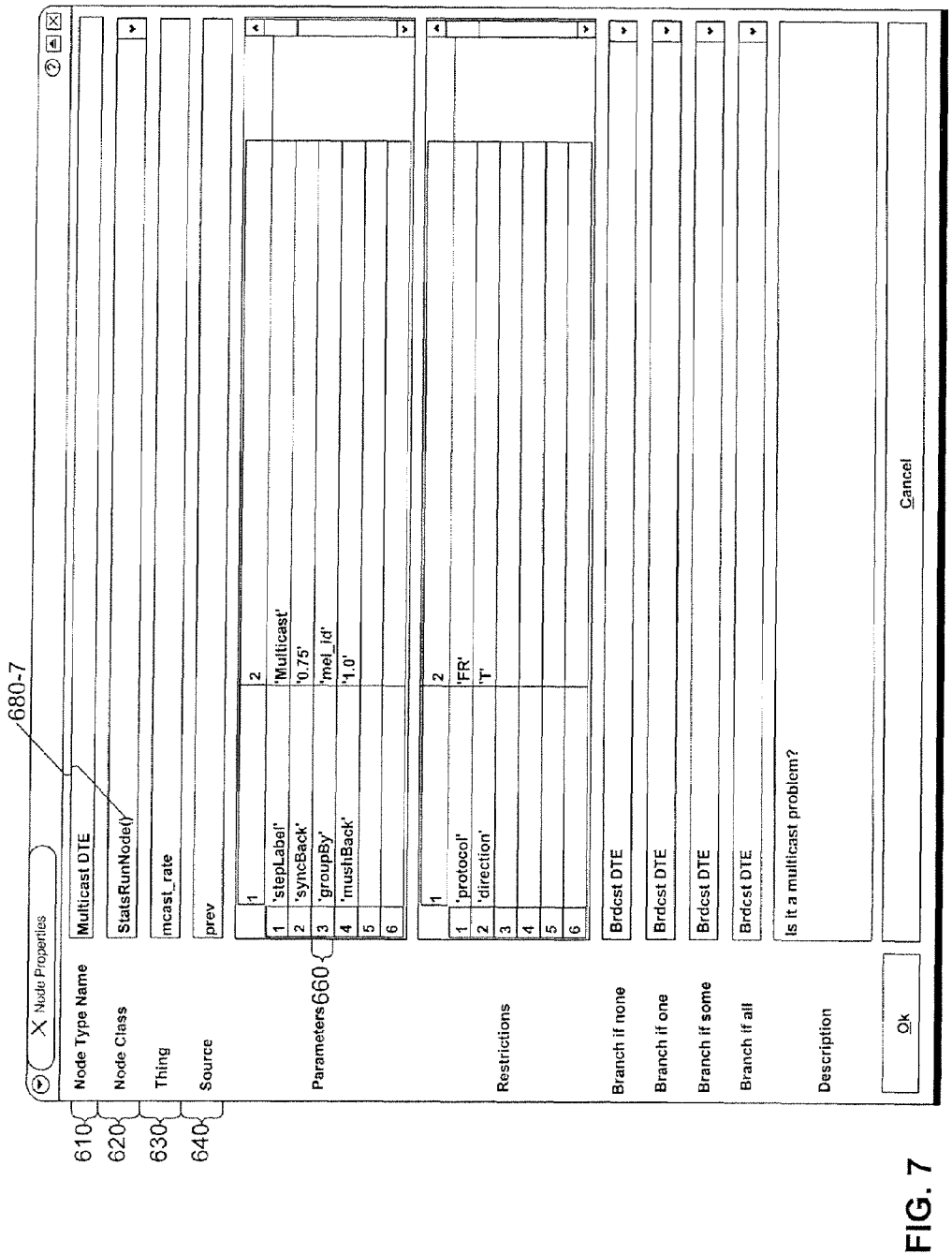

FIG. 7 corresponds with node 510-5, an analysis node. The "Multicast DTE" label of node 510-5 is found in type 610. The "StatsRunNode" name in class 620 in FIG. 7 indicates that a method for dynamic analysis is used to detect anomalous measurements, anomalous measurement being the criterion for analysis. The "mcast_rate" name in thing 630 in FIG. 7 indicates that multicast rate measurements in the records 220 are analyzed. The "prev" name in source 640 in FIG. 7 indicates that any channels that met the criterion of the previous node, in this case node 510-2, are used as the source of records for the analysis in node 510-5. The channels could, for example, be identified by the link identifier values reported with respect to node 510-2. The "mel_id" groupBy name is the attribute selector 660 in FIG. 7, indicating that link identifier is again the selected attribute. Thus, any channels for which anomalous octet rate measurements are detected are also analyzed for whether they also have anomalous multicast rate measurements. Based on the characteristics illustrated in FIG. 7, node 510-5 would create a channel for each link identifier value. Only those link identifier values meeting the first criterion will be represented in the new channels. Based on the characteristics illustrated in FIG. 7, node 510-5 would analyze each channel to determine if it includes anomalous multicast rate measurements. When some channels satisfy the criterion of the node 510-5 analysis, node 510-8 is invoked. When no channels meet the criterion of node 510-5 in decision tree 500, node 510-7 is invoked.

FIG. 8 corresponds with node 510-7, an analysis node. The "Broadcast DTE" label of node 510-7 is found in type 610. The "StatsRunNode" name in class 620 in FIG. 8 indicates that, again, a method for dynamic analysis is used to detect anomalous measurements, anomalous measurement being the criterion for analysis. The "bcast_rate" name in thing 630 in FIG. 8 indicates that the broadcast rate measurements in the records 220 are analyzed. The "topmon.Link DTE" name in source 640 in FIG. 8 indicates that any channels that met the criterion of node 510-2 are also used as the source of records for the analysis in node 510-7. The "mel_id" groupBy name is the attribute selector 660 in FIG. 8, indicating that link identifier is again the selected attribute. Based on the characteristics illustrated in FIG. 8, node 510-7 would create a channel for each link identifier value in the records of the channels that met the criterion of node 510-2 (anomalous octet rate measurements) and analyze each such channel to determine if it also includes anomalous broadcast rate measurements. When no channel satisfies the criterion of the node 510-7 analysis, node 510-11 is invoked. When some such channels meet the anomalous measurement criterion of node 510-7 in decision tree 500, node 510-12 is invoked.

Figure 9:
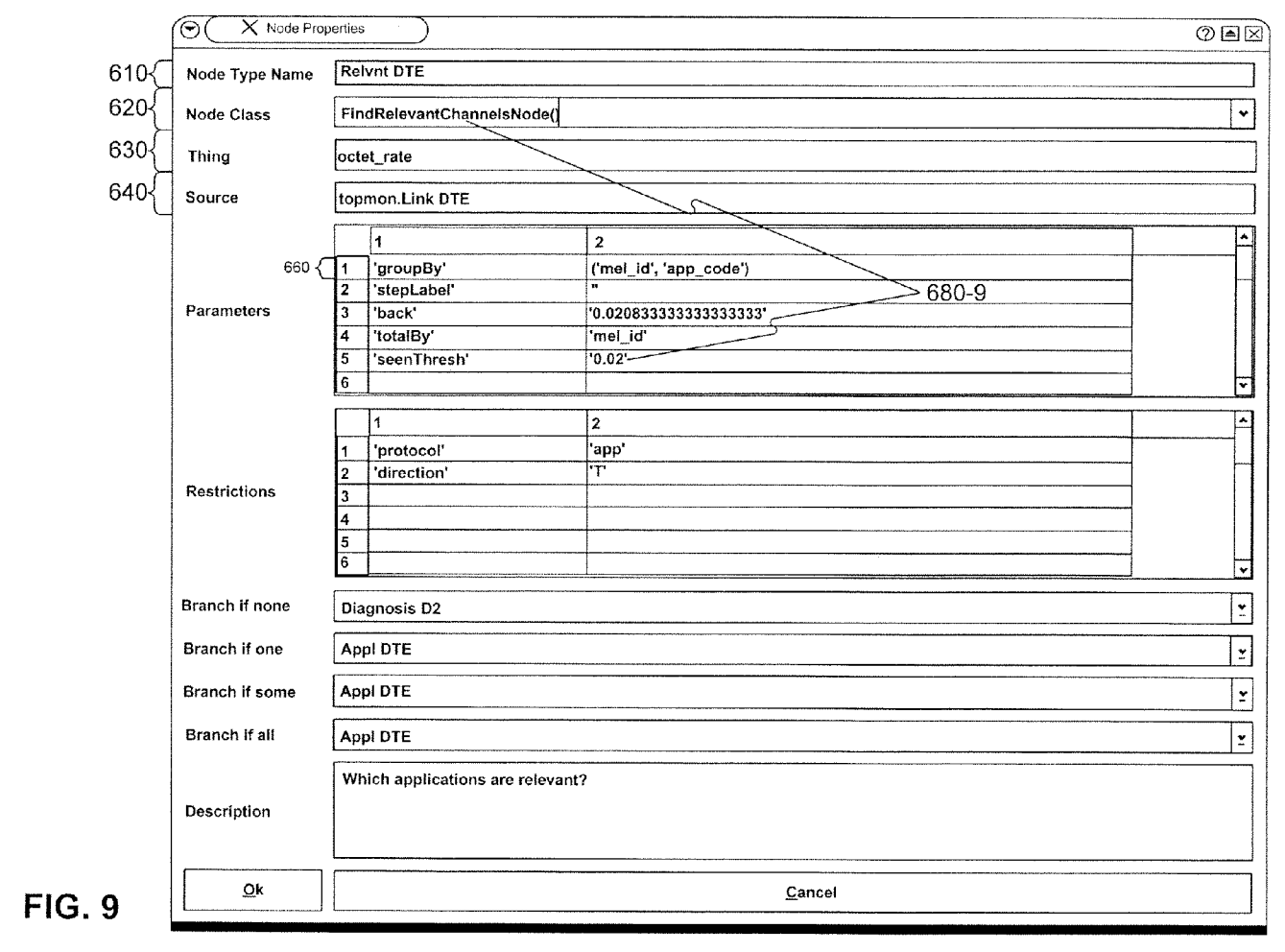

FIG. 9 corresponds with node 510-12, another analysis node. The "Relevant DTE" label of node 510-12 is found in type 610. The "FindRelevantChannelsNode" name in class 620 in FIG. 9 indicates that channels are analyzed to determine if a measurement exceeds an identified percentage of the total that constitutes a maximum value seen over a specified interval, the identified percentage of measurements being the criterion for analysis. The "0.02" seenThresh name identifies 2% as the threshold percentage for the measurements. The "octet_rate" in thing 630 in FIG. 9, coupled with the "topmon.Link DTE" in the source 640 in FIG. 9, indicates that the octet rate measurements in the records of the channels that met the criterion of node 510-2 are analyzed. The "mel_id, app_code" groupBy name is an attribute selector 660 in FIG. 9, indicating that both the link identifier and application identifier are the selected attributes. Based on the characteristics illustrated in FIG. 9, node 510-12 would create a channel for each unique combination of values for the link identifier and the application identifier in the records of the channels that met the criterion of node 510-2 (anomalous octet rate measurements), and analyze each such channel to determine if its octet rate measurements exceed 2% of the total octet rate. If one channel meets the criterion of node 510-12 in decision tree 500, node 510-16 is invoked.

Figure 10:
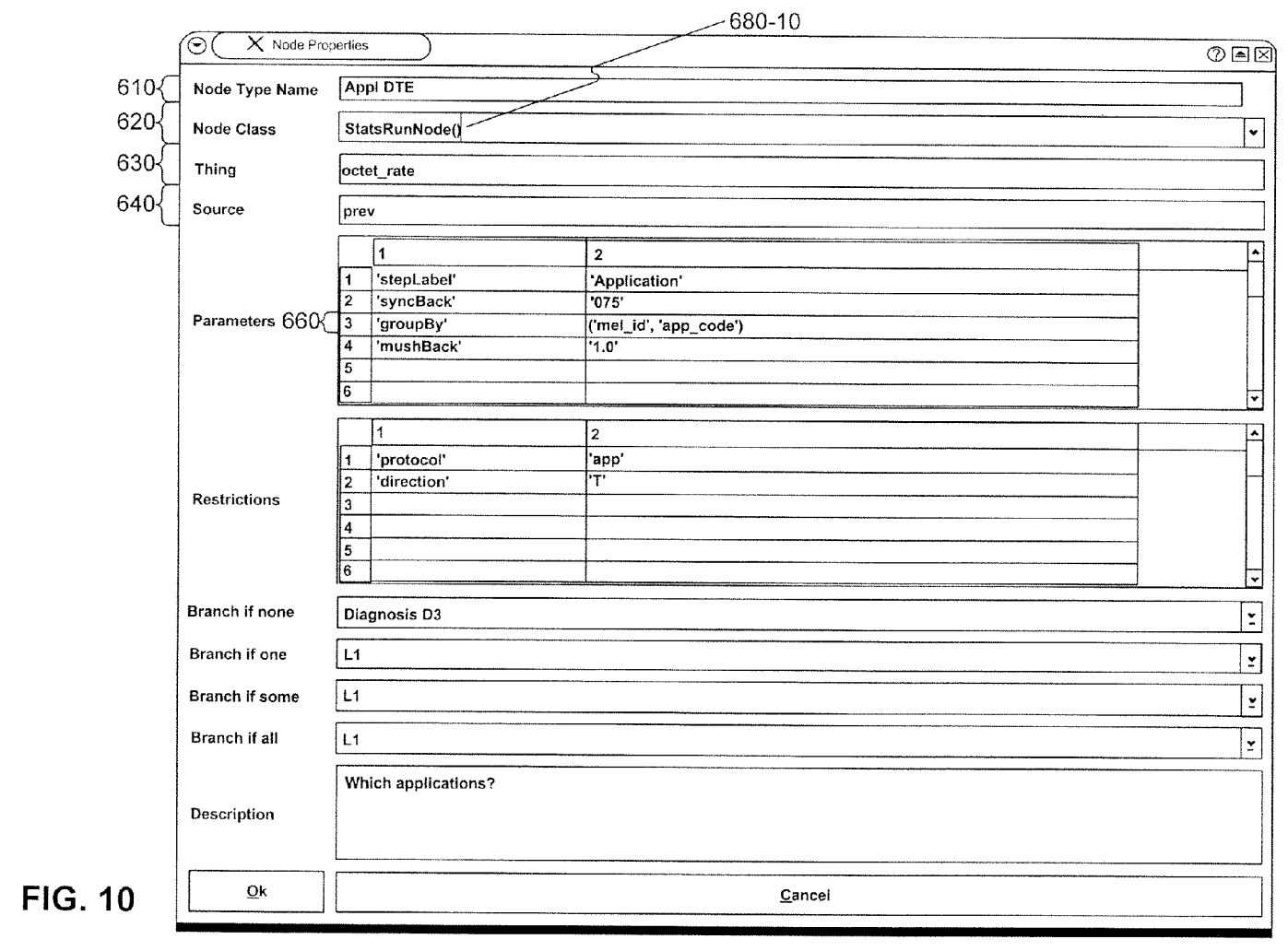

FIG. 10 corresponds with node 510-16, another analysis node. The "AppI DTE" label of node 510-16 is found in type 610. The "StatsRunNode" name in class 620 in FIG. 10 indicates that a method for dynamic analysis is used to detect anomalous measurements, anomalous measurement being the criterion for analysis. The "octet_rate" in thing 630 in FIG. 10, coupled with the "prev" name in source 630 in FIG. 10, indicates that the octet rate measurements in the records 220 of any channels that met the criterion of node 510-12 are analyzed. The "mel_id, app_code" groupBy name is an attribute selector 660 in FIG. 10, indicates that, again, link identifier and application identifier are the selected attributes. Based on the characteristics illustrated in FIG. 10, node 510-16 would create a channel for each unique combination of values for link identifier and the application identifier. Only those link identifier values meeting the criterion of node 510-12 will be represented in the new channels. Based on the characteristics illustrated in FIG. 10, node 510-16 would then analyze each channel to determine if it includes anomalous octet rate measurements.

If no channel meets the criterion of node 510-16 in decision tree 500, node 510-19 is invoked. FIG. 11 corresponds with node 510-19, a notification node. In FIG. 11, the "NotificationNode" name in class 620 indicates that there is a notification of the results of the preceding analysis. Alternatively, if one channel meets the criterion of node 510-16 in decision tree 500, node 510-20 is invoked. FIG. 12 corresponds with node 510-20, which is also a notification node, as shown by the "NotificationNode" name in class 620 of FIG. 12.

Where a node 510 analyzes more than one channel, more than one channel can be analyzed at the same time. Similarly, an analysis can be done for more than one node simultaneously. Further, it should be noted that the outcome of a node analysis will control the parameters of subsequent node analyses, including criterion selection. An example is found at node 510-6, in which the node analysis outcome is based on a count of channels. When only one channel satisfies the criterion of the node 510-6 analysis, node 510-9 is invoked. When all channels satisfy the criterion of the node 510-6 analysis, node 510-10 is invoked.

As with other nodes, such as those described above, node 510-9 will have a defined set of analyses parameters, including attribute selection. Let the attribute selector for node 510-9 be "mel_id, app_code", thus identifying link and application as the selected attributes for node 510-9. Similarly, node 510-10 will have its own defined set of analyses parameters, including attribute selection. Let the attribute selector for node 510-10 be "mel_id, src_host", thus identifying link and source host as the selected attributes for node 510-10. Thus, nodes 510-9 and 510-10 involve different sets of analysis parameters, including attribute selection. Ignoring the outcomes "0" and "S" for node 510-6, the outcome of the analysis of node 510-6 will determine whether, in subsequent analyses of the channels reported from node 510-6, the link and source host set of attributes or the link and application set of attributes will be analyzed.

It should be noted that parameters of subsequent analyses in a decision tree may be the same or they may be different, at the option of the system designer.

FIGS. 13-16 illustrate exemplary alerts associated with the exemplary analysis, consistent with features and principles of the present invention. FIGS. 13-16 illustrate results of analyses in decision tree 500 via a summary results section (matrix 1320) and a detailed results section (text box 1380 in FIG. 13, text box 1480 in FIG. 14, text box 1580 in FIG. 15, and text box 1680 in FIG. 16).

The matrix 1320 shown in the summary section of FIGS. 13-16 has a two-dimensional matrix of attributes with a vertical axis of the attribute values for one of the attributes analyzed in accordance with this invention and a horizontal axis of the attribute values for a second attribute. The matrix 1320 thus provides a graphical representation of which channels representing records of a selected combination of attribute values were found to meet anomaly criteria in their performance measurements. In the case of this embodiment, the vertical axis of the matrix 1320 is the link (interface) identifier and the horizontal axis is the application identifier. A dot indicates the channel having the link identifier value of that row and the application identifier value of that column, was found to meet an anomaly criterion in its performance measurements. For example, anomalous performance was found on the "Interface_4" link for the TELNET, SNMP, NTP, and FTP-CTRL network applications.

It can be seen that, while more than two attributes are analyzed in the embodiment shown in FIG. 5, the matrix 1320 reports anomalous results in channels of combinations of only two of the attributes (link and application). In other embodiments of this invention, the matrix 1320 reports the anomalous results of another attribute pair. The selection of displayed attribute pairs may be made by any selection means. For example, it may be made with reference to the results of relevancy analyses performed by node such as nodes 510-11, 510-12, 510-13, 510-14 shown in FIG. 5. Alternatively, the summary section may display other representations, such as multiple matrices 1320, each with its own attribute pair, selected for display by use of a selection mechanism such as a tab bar, not shown. Also alternatively, the summary section need not be displayed at all.

It should be noted that the summary section of the alert report is developed upon completion of analyses executed over time. While it is in the spirit of the current invention that the analyses represented by the nodes 510 of the decision tree of FIG. 5 may occur simultaneously, it is also contemplated that certain of the analyses require the completion of other analyses to provide input data. At the option of the system designer, the matrix 1320 may be displayed as a complete summary upon completion of the execution of all of the analyses, or it may be displayed partially complete, taking shape as the analyses are executed.

Turning now to the detailed results section of the exemplary alerts, FIGS. 13-16 also include a bar 1360 of tabs, corresponding to types of analyses, to provide access to detailed results of each analysis performed. Each tab corresponds to a type of analysis, for example, "Link", "Multicast", "Broadcast", and "Application." The results displayed in the detailed results section depend on which tab, and corresponding type of analysis, has been selected. Each exemplary tab is associated with a node 510 in a branch of a decision tree 500. At the option of the system designer, the alert display associated with a tab may identify the node that is associated with the analysis which is being displayed. In the embodiment described herein, the nodes are not identified, so it is not apparent from the alert displays which nodes are being analyzed. Further, it is the option of the designer whether to include a tab for each node in the branch being analyzed. In the example illustrated in FIGS. 13-16, the analyses associated with the branch nodes 510-2, 510-5, 510-8, and 510-17 are represented as tabs in bar 1360, but the analysis for node 510-13 is not so represented. Node 510-13 (as are Nodes 510-11, 510-12, and 510-14) is labeled "Relvnt DTE" and invokes a relevancy analysis. The selection of analyses to be displayed in an alert display may be made by the system designer or by any conventional selection means, not shown. In the application for which the instant embodiment was developed, showing the detailed results of node 510-13 was not considered useful. Although a tab is not displayed for the results of relevancy analyses such as conducted at node 510-13, the results of the analysis may be used in other ways, such as described above with reference to node 510-12 to reduce the number of channels analyzed at other nodes, and/or to tailor the summary section of alert reports, as described above.

Figure 13:
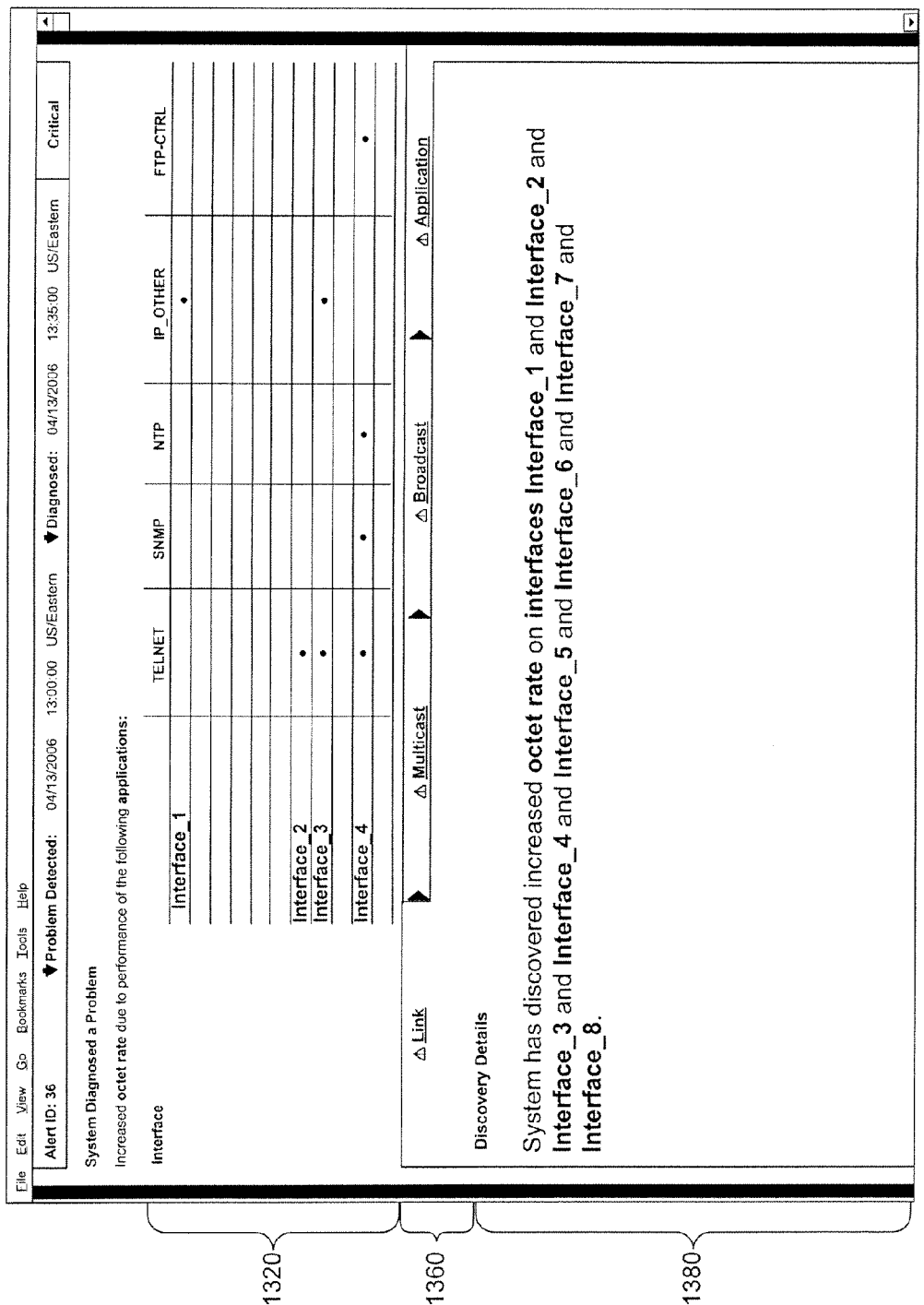
FIGS. 13-16 illustrate results of an exemplary analysis, consistent with features and principles of the present invention.

In FIG. 13, for example, the "Link" tab in bar 1360 has been selected. FIG. 13 is associated with node 510-2, the characteristics of which are illustrated in FIG. 6. For the analysis of node 510-2, channels were created for network performance records having unique link identifier values. The node 510-2 analysis sought to identify anomalous octet rates for each link. Thus, the text box 1380 lists the link identifier values for each channel identified as meeting an anomaly criterion in its octet rate. For example, anomalous performance, as measured by octet rates, was found in records from the stream 200 having links identified as "Interface_1", "Interface_2", "Interface_3", "Interface_4", "Interface_5", "Interface_6", "Interface_7", and "Interface_8."

Figure 14:
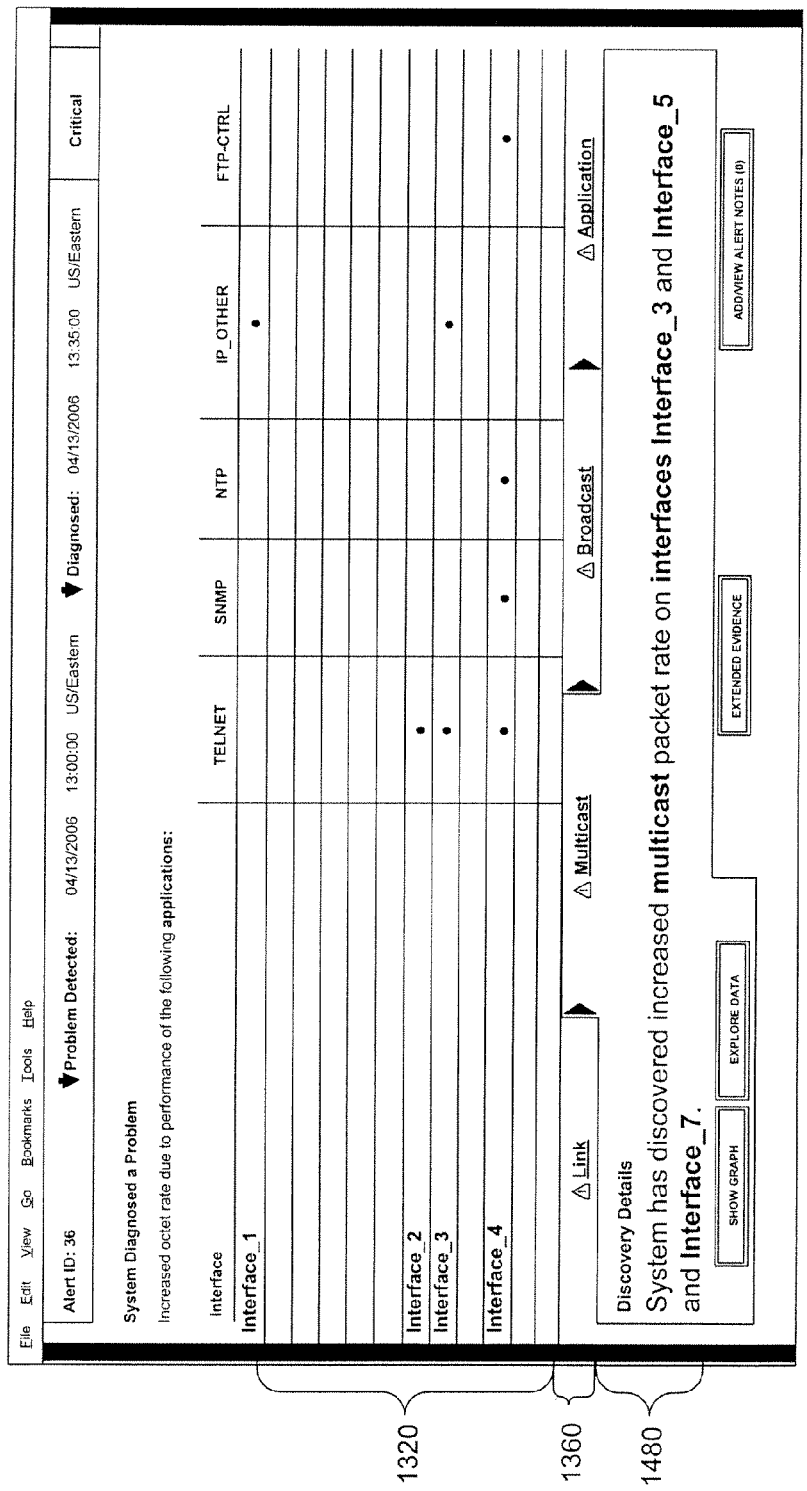

In FIG. 14, the "Multicast" tab in bar 1360 has been selected. FIG. 14 is associated with node 510-5, the characteristics of which are illustrated in FIG. 7. As shown in FIG. 7, the channels identified as the output in node 510-2 were used for analysis in node 510-5. Node 510-5 sought to identify anomalous multicast rates for each link value. Thus, text box 1480 lists the link identifier values for each channel identified as meeting an anomaly criterion in its multicast rate. For example, anomalous performance was found in records from the channels identified in node 510-2 having links identified as "Interface_3", "Interface_5", and "Interface_7." Therefore, it can be seen that channels having Interface_3, Interface_5, and Interface_7 links have anomalous octet and multicast rates.

Figure 15:
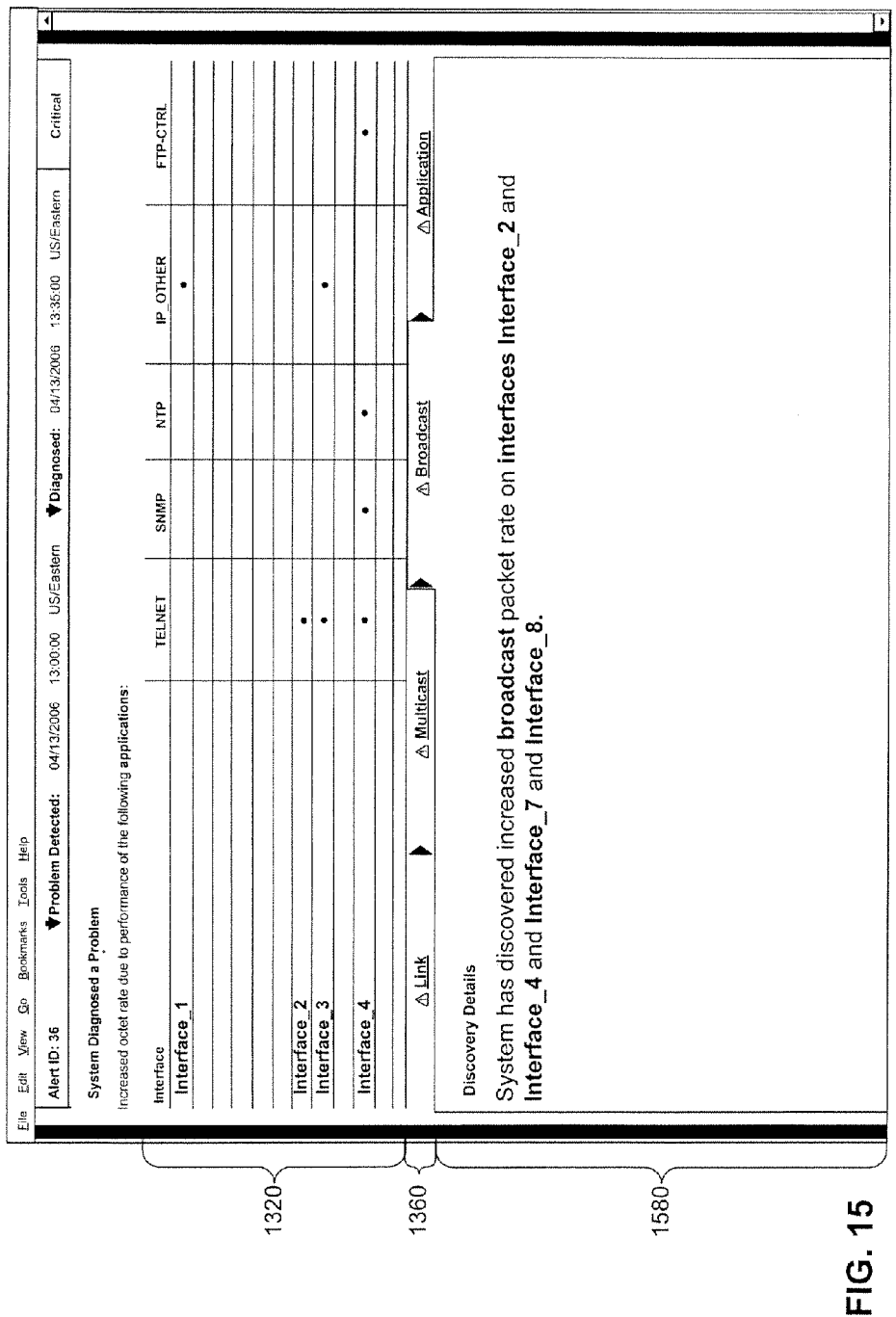

In FIG. 15, the "Broadcast" tab in bar 1360 has been selected. FIG. 15 is associated with node 510-8, the characteristics of which are illustrated in FIG. 8. As shown in FIG. 8, the channels identified as the output in node 510-2 were again used for analysis in node 510-8. Node 510-8 sought to identify anomalous broadcast rates for each link. Thus, text box 1580 lists the link identifier values for each channel identified as meeting an anomaly criterion in its broadcast rate. For example, anomalous performance was found in records from the channels identified in node 510-2 having links identified as "Interface_2", "Interface_4", "Interface_7", and "Interface_8." Therefore, it can be seen that channels having Interface_2, Interface_4, Interface_7, and Interface_8 links have anomalous octet and broadcast rates.

Figure 16:
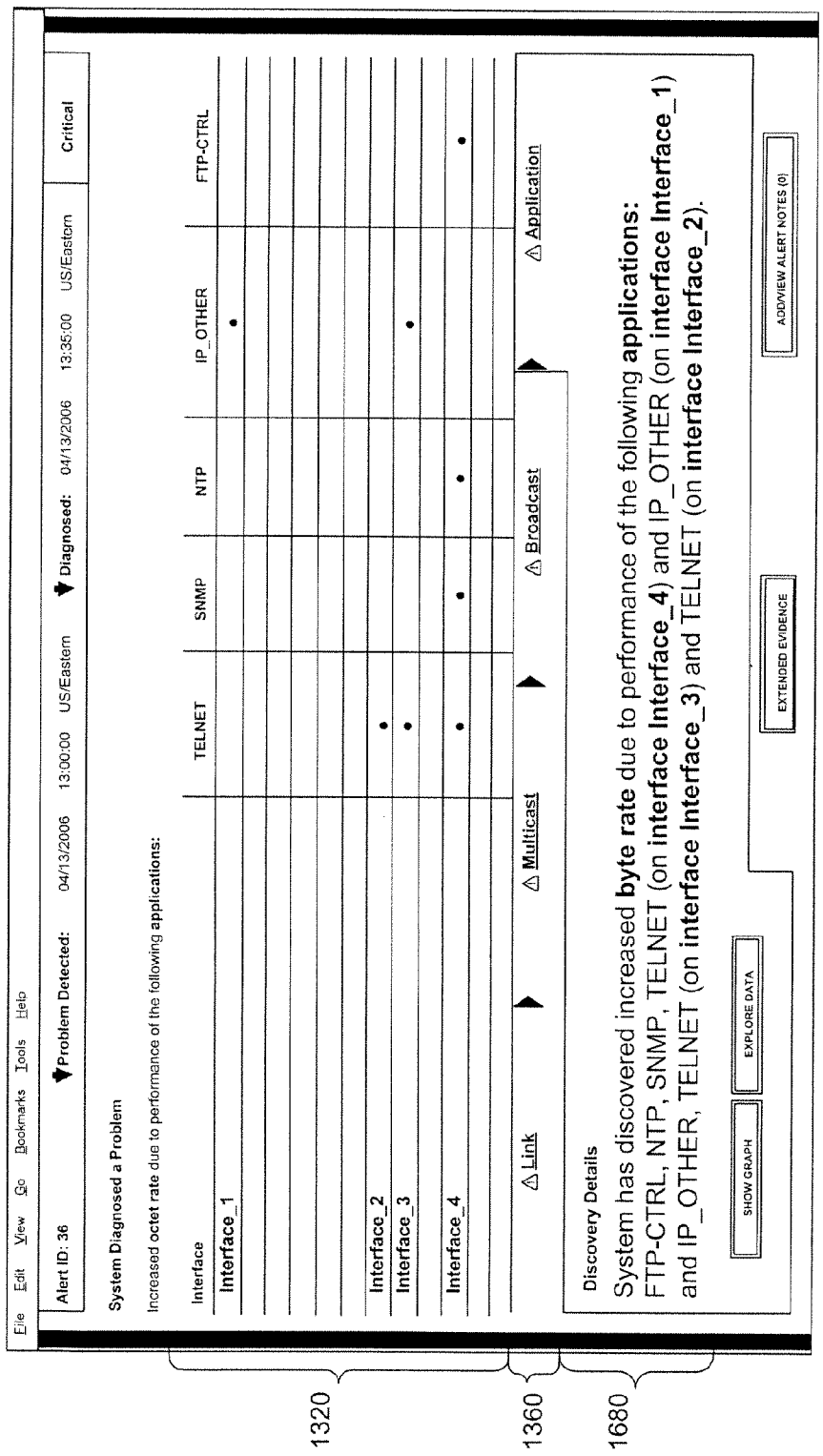

In FIG. 16, the "Application" tab in bar 1360 has been selected, to display any application experiencing anomalous performance, as measured by octet rate, on any link experiencing anomalous performance. Accordingly, text box 1680 lists the link and application identifier value pairs meeting the anomaly criterion. For example, anomalous octet rate performance was found in records from channels having FTP-CTRL, NTP, SNMP, and TELNET applications on the Interface_4 link, channels having IP_Other and TELNET applications on the Interface_3 link, channels having the TELNET applications on Interface_2 link, and channels having the IP_Other application on the Interface_1 link.

In another embodiment, the invention comprises a system for analyzing a stream of data records relating to electronic data processing system performance, having a memory and a processor that are configured to perform the methods described above. Further, in another embodiment, the invention comprises a computer program having instructions to configure a computer to execute the methods described above.

Consistent with features and principles of the present invention, data records can be used to determine if a computer meets certain criteria. Attributes of the computer data records can include process identifiers for running processes; network interface identifiers; IP address; operating system; geographic location such as state or country; and function such as desktop, web server, and email server. Measurements in the computer measure records can include memory usage per process; CPU utilization, both total and per process; amount of free memory; packet rate transmitted onto the network per network interface; context switch rate; database query rate; disk I/O rate; and page fault rate; number of active processes; and process creation rate.

Similarly, data records can be used to determine if a router meets certain criteria. Attributes of the router data records can include process identifiers for running processes; network interface identifiers; application identifiers; router IP address; function such as access, edge, and core; geographic location such as state or country; autonomous system number; and active routing protocols such as BGP and OSPF. Measurements in the router measure records can include memory usage per process; CPU utilization, both total and per process; amount of free memory; packet rate transmitted onto the network per network interface; error rate on received packets per network interface; octet rate per application per network interface; context switch rate; queue length; and queue drops per second.

Also similarly, data records can be used to determine if web transactions meet certain criteria. Attributes of data records associated with web transactions can include step name, DNS server identifier, page component name, server IP address, HTTP content type, and error type. Measurements in records associated with web transactions can include TCP connect time, DNS lookup time, number of bytes on page, time to download page component, number of bytes in HTTP header, time to download HTTP header, number of page components on page, number of errors encountered.

Further, consistent with features and principles of the present invention, the methods and systems described herein may be used in any application, such as financial services, or marketing, business, economic, or scientific research, in which information from instances or events is developed or collected and data records are developed therefrom, and in which the data records are analyzed to determine if sets of the instances or events have certain attributes and meet certain criteria. Attributes of data records associated with such applications can include any appropriate characteristic, and measurements in records associated with such applications can include any measurable element.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for analyzing a stream of data records relating to electronic data processing system performance, wherein each data record includes an attribute value for each of a plurality of attributes of an electronic data processing system, the method comprising:
    creating, from the stream, a channel of data records for each attribute value of a set of attributes having as a member at least one attribute, thereby creating a first set of channels;
    analyzing each channel in the first set of channels to identify each channel meeting a first criterion, thereby creating a set of first criterion meeting channels;
    reporting the attribute value of each member of the set of attributes associated with each channel in the set of first criterion meeting channels;
    creating a set of first criterion meeting attribute value combination channels by using the set of first criterion meeting channels to identify each channel of data records therein having a unique combination of attribute values of a first attribute and a second attribute and meeting the first criterion; and
    reporting the unique combination of attribute values of the first attribute and the second attribute associated with each channel in the set of first criterion meeting attribute value combination channels.

2. The method of claim 1, wherein analyzing a first channel in the first set of channels and analyzing a second channel in the first set of channels occur simultaneously.

3. The method of claim 1, wherein the at least one attribute comprises the first attribute.

4. The method of claim 1, wherein the at least one attribute comprises the first attribute and the second attribute such that a channel in the first set includes data records having a unique combination of attribute values of the first attribute and the second attribute.

5. The method of claim 1, wherein analyzing each channel in the first set to identify each channel meeting a first criterion further comprises:
    analyzing a first measured value in the data records in a first channel in the first set to determine if the first channel meets the first criterion; and
    analyzing a second measured value in the data records in the first channel in the first set to determine if the first channel meets a third criterion.

6. The method of claim 1, further comprising, prior to creating the set of first criterion meeting attribute value combination channels,
    creating, from the stream, a channel of data records for each attribute value of a third attribute thereby creating a third set of channels;
    analyzing each channel in the third set to identify each channel meeting a third criterion, thereby creating a set of third criterion meeting channels; and
    reporting the attribute value of the third attribute for each channel in the set of third criterion meeting channels.

7. The method of claim 1, wherein a number of attribute values of a selected attribute in the stream varies over time.

8. The method of claim 1, wherein each data record includes an attribute value for each of a plurality of attributes of a network and at least one measured value related to network performance.

9. The method of claim 8, wherein the plurality of attributes includes a link identifier and an application identifier.

10. The method of claim 1, wherein each data record includes an attribute value for each of a plurality of attributes of a computer and at least one measured value related to computer performance.

11. The method of claim 1, wherein creating the set of first criterion meeting attribute value combination channels further comprises:
    creating a second set of channels for data records for each attribute value of the second attribute; and
    using the second set of channels to identify each channel, in the set of first criterion meeting channels, having the unique combination of attribute values and meeting the first criterion.

12. The method of claim 11,
    wherein creating the first set of channels and creating the second set of channels occur simultaneously, and
    wherein creating the set of first criterion meeting attribute value combination channels further comprises comparing the set of first criterion meeting channels and the second set of channels to identify channels that are common to both sets, and developing the set of first criterion meeting attribute value combination channels therefrom.

13. The method of claim 1, wherein creating the set of first criterion meeting attribute value combination channels further comprises:
    creating a second set of channels for data records for each attribute value of the second attribute; and
    analyzing each channel in the second set of channels to identify each channel meeting a second criterion, to create a set of second criterion meeting channels, and
    analyzing the set of second criterion meeting channels and the set of first criterion meeting channels to identify each channel having the unique combination of attribute values and meeting the first criterion and the second criterion, thereby creating a set of first and second criteria meeting attribute value combination channels; and
    wherein reporting the unique combination of attribute values further comprises reporting the unique combination of attribute values of the first attribute and the second attribute associated with each channel in the set of first and second criteria meeting attribute value combination channels.

14. The method of claim 1, wherein creating the first set of channels further comprises creating the channels from the stream of data records.

15. The method of claim 1, wherein the stream of data records comprises a stream of measurement records relating to electronic data processing, wherein each measurement record includes an attribute value for each of a plurality of attributes of the electronic data processing system.

16. A computer-readable medium comprising instructions to configure a computer to execute a method for analyzing a stream of data records relating to electronic data processing system performance, wherein each of the data records includes an attribute value for each of a plurality of attributes of the electronic data processing system, the method comprising:

creating, from the stream, a channel of data records for each attribute value of at least one attribute, thereby creating a first set of channels;

analyzing each channel in the first set to identify each channel meeting a first criterion, thereby creating a set of first criterion meeting channels;

reporting the value of each at least one attribute for each channel in the set of first criterion meeting channels;

creating a set of first criterion meeting attribute value combination channels by using the set of first criterion meeting channels to identify each channel of data records therein having a unique combination of attribute values of a first attribute and a second attribute and meeting the first criterion, and reporting the unique combination of attribute values of the first attribute and the second attribute for each channel in the set of first criterion meeting attribute value combination channels.

17. The computer-readable medium of claim 16, wherein the stream of data records comprises a stream of measurement records relating to electronic data processing, wherein each measurement record includes an attribute value for each of a plurality of attributes of the electronic data processing system.

18. A system for analyzing a stream of data records relating to electronic data processing system performance, wherein each data record includes an attribute value for each of a plurality of attributes of the electronic data processing system, comprising:

memory; and a processor, wherein the memory and processor are configured to perform a method comprising:

creating, from the stream, a channel of data records for each attribute value of at least one attribute thereby creating a first set of channels;

analyzing each channel in the first set to identify each channel meeting a first criterion, thereby creating a set of first criterion meeting channels;

reporting the value of each at least one attribute for each channel in the set of first criterion meeting channels;

creating a set of first criterion meeting attribute value combination channels by using the set of first criterion meeting channels to identify each channel of data records therein having a unique combination of attribute values of a first attribute and a second attribute and meeting the first criterion; and reporting the unique combination of attribute values of the first attribute and the second attribute for each channel in the set of first criterion meeting attribute value combination channels.

19. The system of claim 18, wherein the stream of data records comprises a stream of measurement records relating to electronic data processing, wherein each measurement record includes an attribute value for each of a plurality of attributes of the electronic data processing system.

20. A method for analyzing a stream of data records relating to electronic data processing system performance, wherein each of the data records includes an attribute value for a plurality of attributes of the electronic data processing system, the method comprising:

creating, from the stream, a channel of data records for each unique combination of attribute values of a first attribute and a second attribute, thereby creating a first set of channels such that a channel in the first set includes data records having a unique combination of attribute values of the first attribute and the second attribute;

analyzing each channel in the first set to identify each channel meeting a first criterion, thereby creating a set of first criterion meeting channels;

reporting the unique combination of attribute values of the first attribute and the second attribute for each channel in the set of first criterion meeting channels;

creating, from the first set of first criterion meeting channels, a channel of data records for each attribute value of at least one attribute, thereby creating a second set of channels;

analyzing each channel in the second set to identify each channel meeting a second criterion, thereby creating a set of first and second criteria meeting channels; and reporting the attribute value of each of the at least one attribute for each channel in the set of first and second criteria meeting channels.

21. A computer-readable medium comprising instructions to configure a computer to execute a method for analyzing a stream of data records relating to electronic data processing system performance, wherein each of the data records includes an attribute value for a plurality of attributes of the electronic data processing system, the method comprising:

creating, from the stream, a channel of data records for each unique combination of values of a first attribute and a second attribute, thereby creating a first set of channels such that a channel in the first set includes data records having a unique combination of attribute values of the first attribute and the second attribute;

analyzing each channel in the first set to identify each channel meeting a first criterion, thereby creating a set of first criterion meeting channels;

reporting the unique combination of values of the first attribute and the second attribute for each channel in the set of first criterion meeting channels;

creating, from a channel in the set of first criterion meeting channels, a channel of data records for each attribute value of at least one attribute, thereby creating a second set of channels;

analyzing each channel in the second set to identify each channel meeting a second criterion, thereby creating a set of first and second criteria meeting channels; and reporting the attribute value of each of the at least one attribute for each channel in the set of first and second criteria meeting channels.

22. A system for analyzing a stream of data records relating to electronic data processing system performance, wherein each data record includes a value for a plurality of attributes of the electronic data processing system, comprising:

memory; and a processor, wherein the memory and processor are configured to perform a method comprising:

creating, from the stream, a channel of data records for each unique combination of values of a first attribute and a second attribute, thereby creating a first set of channels such that a channel in the first set includes data records having a unique combination of values of the first attribute and the second attribute;

analyzing each channel in the first set to identify each channel meeting a first criterion, thereby creating a set of first criterion meeting channels;

reporting the unique combination of values of the first attribute and the second attribute for each channel in the set of first criterion meeting channels;

creating, from a channel in the set of first criterion meeting channels, a channel of data records for each value of at least a third attribute, thereby creating a second set of channels;

analyzing each channel in the second set to identify each channel meeting a second criterion, thereby creating a set of first and second criteria meeting channels; and reporting the value of each of the at least third attribute for each channel in the set of first and second criteria meeting channels.

23. The method of claim 1, wherein analyzing each channel in the first set of channels further comprises identifying an outcome of the analyzing; and further comprising choosing the second attribute based on the outcome.

\* \* \* \* \*

UNITED STATES PATENT AND TRADEMARK OFFICE
CERTIFICATE OF CORRECTION

PATENT NO. : 7,613,714 B2 Page 1 of 1
APPLICATION NO. : 11/743025
DATED : November 3, 2009
INVENTOR(S) : Ronald G. Hiller et al.

It is certified that error appears in the above-identified patent and that said Letters Patent is hereby corrected as shown below:

On the face of the patent, the inventor's name "Armin Arshad Abdulghani" should read --Amin Arshad Abdulghani--.

Signed and Sealed this

Sixth Day of April, 2010

David J. Kappos
*Director of the United States Patent and Trademark Office*